Patented Nov. 27, 1934

1,982,223

UNITED STATES PATENT OFFICE 1,982,223

METHOD OF PURIFYING CARBON DIOXIDE GAS

Floyd J. Metzger, New York, N. Y., and Arthur A. Backus, South Orange, N. J., assignors, by mesne assignments, to U. S. Industrial Alcohol Company, New York, N. Y., a corporation of West Virginia No Drawing. Application March 14, 1931, Serial No. 522,776

4 Claims. (Cl. 23—150)

This invention relates to the preparation of carbon dioxide for various commercial and industrial uses and particularly to the purification of the gas.

Carbon dioxide gas as produced commercially carries a considerable proportion of moisture, and is frequently contaminated with minute quantities of materials which impart an odor to the gas. Gas produced by fermentation is particularly disagreeable in odor. The gas may also pick up oil particles and odors from the apparatus in which it is compressed for bottling.

Whether the gas is used in gaseous, liquid or solid forms, the contaminating materials are objectionable and often render the product unfit for use. It is desirable also to remove the moisture carried by the gas. Both odors and moisture are particularly undesirable when the gas is converted into snow or ice by refrigeration. Odors are concentrated by the freezing of the gas, and moisture tends to solidify and interrupt the operation of the apparatus in which the gas is converted into the solid form.

It is the object of the present invention to provide an improved method of treating carbon dioxide gas wherein odors, moisture and oily particles are removed therefrom most efficiently and satisfactorily.

We have discovered that alumina, i. e. aluminum oxide in a porous granular form having a high adsorptive capacity, is a very satisfactory agent for the purification of carbon dioxide gas. Alumina adsorbs odors from the gas to a very marked degree and is also a desirable agent for the separation of oil. It is even more effective for the removal of moisture from the gas. Among the advantages of alumina for the purpose of the invention is its ability to perform its function for considerable periods, thus avoiding frequent revivification, and the ease with which revivification can be accomplished by simply subjecting the material to a current of heated air or other gas.

We find, however, that the most efficient results are accomplished by the combined use of alumina with another adsorptive agent of a complementary character, such as adsorptive carbon. The carbon which we prefer to use is that made from cocoanut shells and commercially known as activated charcoal. Other similar adsorptive carbon materials might be used.

Alumina, though capable of adsorbing odors almost as completely as activated carbon, has not the capacity of removing so much, that is, it will remove odors from a less volume of the gas. It will, however, continue to remove moisture effectively long after its capacity to adsorb odors is reduced to the point that it is no longer effective for that purpose. On the other hand, activated carbon will retain its capacity to remove odors after it has become no longer effective to separate moisture from the gas. The properties and characteristics of the materials thus permit the utilization of both to ensure the maximum efficiency of purification.

The pressure at which purification is carried out also has a marked effect upon the results obtained. Ordinarily carbon dioxide gas is compressed for use to a pressure of about 1000 pounds per square inch in three stages, first to 75–100 pounds, then to approximately 250 pounds, and finally to the full pressure of about 1000 pounds. Both alumina and activated carbon have the maximum adsorptive capacity with the gas at about atmospheric pressure and the least capacity at or above 1000 pounds per square inch. However, at atmospheric pressure the gas carries a high proportion of moisture, much of which is condensed and separated between the successive stages of compression. Different, though satisfactory, results are obtainable, therefore, by disposing the alumina and activated carbon in suitable relation to the compression stages.

It is to be understood that to effect the adsorption of odors, moisture, and other contaminating constituents from the gas we may employ any suitable apparatus adapted to ensure thorough contact of the gas with the adsorption agent. Any suitable receptacles for these agents may be disposed with suitable connecting pipes or conduits whereby the gas is caused to flow successively through the receptacles in which the purification is accomplished.

We find, for example, that effective purification can be accomplished by passing the gas at atmospheric pressure through alumina, particularly if the gas is not highly charged with odoriferous compounds. It is, however, more satisfactory and efficient to pass the gas successively through activated carbon and alumina because the complementary properties of these agents permit the complete removal of the contaminating materials from the largest volume of gas, i. e., revivification can be delayed for longer periods with a given volume of gas flow without danger of passing some of the odors or moisture to the gaseous product. Thus, if the carbon becomes depleted in capacity to absorb moisture the alumina will catch this material. Moreover, any odors which escape the carbon will be removed by the alumina.

Eventually both the carbon and alumina must be revivified. This is accomplished in the case of carbon by first blowing hot steam through the mass and following with a pure, dry, inert gas such as warm or hot carbon dioxide. Alumina may be revivified at a higher temperature, preferably by blowing hot air through the mass. After this simple treatment, the carbon and alumina are again available as purifying agents.

Instead of introducing both activated carbon and alumina before the first stage of compression, we find it advantageous to employ other arrangements. Thus the activated carbon can be employed before the first stage and the alumina may be introduced after the first or second stages of compression or even after the third stage. This arrangement has the advantage that some of the moisture will be condensed and purged from the gas following each stage of the compression. The drying capacity of the alumina is accordingly prolonged.

Alternatively we find it advantageous to introduce the activated carbon after the first stage of compression and the alumina after the second or even the third stage. Both the activated carbon and alumina can be introduced, however, after the first or second stage of compression.

In general we prefer to pass the gas through activated carbon at substantially atmospheric pressure, i. e., before the first stage of compression and then through alumina after the first or second stage. This arrangement affords a most efficient combination, the carbon acting effectively to remove most or all of the odors and some of the moisture, while the balance of the moisture and any odors which escape the carbon are separated by the alumina. Likewise any oil particles which contaminate the gas in the preceding stages of compression are removed by the alumina.

By the practice of the invention as described, we are able to purify carbon dioxide gas otherwise unfit for commercial use, removing therefrom all disagreeable odors and the moisture content and oily particles. The purified gas is suitable for any of the usual commercial and industrial applications such as charging potable liquids, refrigeration and the maintenance of inert atmospheres for the preservation of foodstuffs and the like.

Various changes can be made in the details of procedure and the apparatus employed without departing from the invention or sacrificing any of the advantages thereof.

We claim:

1. The method of treating carbon dioxide gas to remove odors and moisture therefrom which comprises subjecting the gas at substantially atmospheric pressure to activated carbon, compressing the gas and then passing it through porous, granular aluminum oxide.

2. The method of treating carbon dioxide gas to remove odors and moisture therefrom which comprises compressing the gas and subjecting it to activated carbon and porous granular aluminum oxide.

3. The method of treating carbon dioxide gas to remove odors and moisture therefrom which comprises subjecting it to activated carbon, compressing the gas and thereby separating a portion of the moisture, and then causing the gas to contact with porous, granular aluminum oxide to remove the balance of the moisture and any remaining odors.

4. The method of treating carbon dioxide gas to remove odors and moisture therefrom which comprises subjecting the gas to treatment with activated carbon, compressing the gas in successive stages and treating the gas with porous granular aluminum oxide.

FLOYD J. METZGER.
ARTHUR A. BACKUS.

CERTIFICATE OF CORRECTION.

Patent No. 1,982,223.  November 27, 1934.

FLOYD J. METZGER, ET AL.

It is hereby certified that the above numbered patent was erroneously issued to "U. S. Industrial Alcohol Company, of New York, N. Y., a corporation of West Virginia", as owner of the entire interest in said invention whereas said patent should have been issued by direct and mesne assignments of one-half interest each to Air Reduction Company, Incorporated, New York, N. Y., a corporation of New York, and U. S. Industrial Alcohol Company, New York, N. Y., a corporation of West Virginia, as shown by the records of assignments in this office; and that the said Letters Patent should be read with this correction therein that the same may conform to the record of the case in the Patent Office.

Signed and sealed this 5th day of February, A. D. 1935.

Leslie Frazer (Seal)  Acting Commissioner of Patents.